(12) United States Patent
Gross et al.

(10) Patent No.: US 11,720,961 B2
(45) Date of Patent: Aug. 8, 2023

(54) VALIDATION METHOD AND SYSTEM TO IMPROVE DATA ACCURACY

(71) Applicant: SoftWorks AI, LLC, Forest Hills, NY (US)

(72) Inventors: Ari Gross, West Hempstead, NY (US); Matthew Joshua Khan Persad, Brooklyn, NY (US); Yunhao Shi, New Hyde Park, NY (US); Perry Kangoun, New York, NY (US); Talya Klein, Flushing, NY (US)

(73) Assignee: SOFTWORKS AI, LLC, Forest Hills, NY (US)

( * ) Notice: Subject to any disclaimer, the term of this patent is extended or adjusted under 35 U.S.C. 154(b) by 74 days.

(21) Appl. No.: 17/460,640

(22) Filed: Aug. 30, 2021

(65) Prior Publication Data

US 2022/0067828 A1    Mar. 3, 2022

Related U.S. Application Data

(60) Provisional application No. 63/072,360, filed on Aug. 31, 2020.

(51) Int. Cl.
  *G06Q 40/03*    (2023.01)
  *G06F 16/93*    (2019.01)
  *G06V 30/40*    (2022.01)
  *G06V 30/148*   (2022.01)

(52) U.S. Cl.
  CPC ............. *G06Q 40/03* (2023.01); *G06F 16/93* (2019.01); *G06V 30/153* (2022.01); *G06V 30/40* (2022.01)

(58) Field of Classification Search
  CPC ...... G06F 16/93; G06V 30/153; G06V 30/40; G06V 10/817
  See application file for complete search history.

(56) References Cited

U.S. PATENT DOCUMENTS

2018/0025222 A1\*  1/2018  Yellapragada ....... G06V 30/416
                                                          382/176

OTHER PUBLICATIONS

SoftWorks AI, LLC, "Smarter Document Capture", Aug. 2018, 17 pages.
SoftWorks AI, LLC, "Artificial Intelligence in Business", Feb. 2018, 10 pages.
Hunt, Carolyn, "Automated Invoice Processing from the Accounts Payable Perspective", SoftWorks AI, LLC, Aug. 2018, 7 pages.
SoftWorks AI, LLC, "The Benefits of Mortgage Process Automation", Apr. 2018, 4 pages.
SoftWorks AI, LLC, "How Automated Data Capture Takes Knowledge Workers to New Heights", Aug. 2018, 7 pages.
Gross et al., "Reimagining Mortgage Processing with Intelligent Automation and Rpa", HW Media LLC, Mar. 2021, 25 pages.
Gross et al., "Achieving Touchless Mortgage Automation: Insights from SoftWorks AI and Tavant", HW Media LLC, Jan. 2021, 18 pages.

(Continued)

*Primary Examiner* — King Y Poon
*Assistant Examiner* — Michael L Burleson
(74) *Attorney, Agent, or Firm* — Koffsky Schwalb LLC

(57) ABSTRACT

An automated method and system for validating (cross-validating) data fields in an electronic document, such as a document that has been passed through an optical character recognition ("OCR") or Intelligent Document Recognition ("IDR") system or software, to improve accuracy of the electronic document.

10 Claims, 8 Drawing Sheets

(56) References Cited

OTHER PUBLICATIONS

SoftWorks AI, LLC, "Modernizing Mortgage Automation", Aug. 11, 2021, 9 pages.
Gross et al., "Solving the Post-Close Challenge with Intelligent Automation", HW Media LLC, May 2021, 23 pages.
SoftWorks AI, LLC, "The Guide to Invoice Processing", Jan. 2019, 7 pages.
SoftWorks AI, LLC, "Understanding the Modern Landscape of RPA", Sep. 2018, 10 pages.

* cited by examiner

200

NOTE

April 13, 2019
[Date]

San Francisco,     California
[City]     [State]

LOAN #: 100161278
MIN: 1012859-0100161278-8

210 → 2240 SW 42nd Way, Fort Lauderdale, FL 33317
[Property Address]

See attached Exhibit A - Legel Description

*For Informational purposes only:*

Address: 2240 South West 42nd Way, Fort Lauderdale, FL 33317

214

Closing Disclosure

*This form is a statement of final loan term document with your Loan Estimate*

| Closing Information | | Transaction Information | |
|---|---|---|---|
| Date Issued | 4/28/2019 | Borrower | Patricia Sea |
| Closing Date | 4/13/2019 | | 2240 SW 42nd Way |
| Disbursement Date | 4/18/2019 | | Fort Lauderdale, FL 33317 |
| Settlement Agent | Unisource | Lender | Agora Lending, a division |
| File # | UNLS1115818 | | of Ethos Lending LLC |
| Property | 2240 SW 42nd Way, | 212 | |
| | Fort Lauderdale, FL 33317 | | |
| Appraised Prop. Value | $250,000 | | |

| Form Name | Field Name | Final Value | Initial Confidence | Result | RuleName |
|---|---|---|---|---|---|
| Form 1003 Uniform Residential Loan Application | borrower_first_name | Mildred | 100 | Pass | Borrower First Name |
| Form 1003 Uniform Residential Loan Application | borrower_first_name | Mildred | 100 | Pass | Borrower First Name |
| Standard Flood Hazard Determination | borrower_first_name | Mildred | 100 | Pass | Borrower First Name |
| DU-Desktop Underwriting | borrower_name_first | Mildred | 83 | Pass | Borrower First Name |
| Form 1008 Uniform Underwriting and Transmittal Summary | borrower_first_name | Mildred | 69 | Pass | Borrower First Name |
| Credit Report | borrower_first_name | Mildred | 0 | Pass | Borrower First Name |
| Note | borrower_first_name | Mildred | 0 | Pass | Borrower First Name |
| Form 1003 Uniform Residential Loan Application | borrower_last_name | Hart | 100 | Pass | Borrower Last Name |
| Form 1003 Uniform Residential Loan Application | borrower_last_name | Hart | 100 | Pass | Borrower Last Name |
| Standard Flood Hazard Determination | borrower_last_name | Hart | 100 | Pass | Borrower Last Name |
| DU-Desktop Underwriting | borrower_name_first | Hart | 83 | Pass | Borrower Last Name |
| Form 1008 Uniform Underwriting and Transmittal Summary | borrower_last_name | Hart | 69 | Pass | Borrower Last Name |
| Credit Report | borrower_last_name | Hart | 0 | Pass | Borrower Last Name |
| Note | borrower_last_name | Hart | 0 | Pass | Borrower Last Name |
| Credit Report | borrower_social_security_number | 296-57-1241 | 93 | Pass | Borrower SSN |
| Form 1003 Uniform Residential Loan Application | borrower_ssn | 296-57-1241 | 70 | Warning | Borrower SSN |
| Form 1003 Uniform Residential Loan Application | borrower_ssn | 296571241 | 69 | Pass | Borrower SSN |
| Closing Disclosure | it_loanamount | 546826 | 100 | Pass | Loan Amount |
| Form 1003 Uniform Residential Loan Application | loan_amount | 546826 | 100 | Pass | Loan Amount |
| DU-Desktop Underwriting | total_loan_amount | 546826 | 100 | Pass | Loan Amount |
| Form 1003 Uniform Residential Loan Application | loan_amount | 546826 | 97 | Pass | Loan Amount |
| Note | loan_amount | 546826 | 94 | Pass | Loan Amount |
| Loan Estimate | it_loanamount | 546826 | 91 | Pass | Loan Amount |
| Closing Disclosure | it_loanamount | 546826 | 70 | Pass | Loan Amount |
| Form 1003 Uniform Residential Loan Application | no_of_months | 240 | 100 | Pass | Loan Term |
| DU-Desktop Underwriting | loan_term | 240 | 100 | Pass | Loan Term |
| Loan Estimate | loantermyears | 20 | 100 | Pass | Loan Term |
| Closing Disclosure | loanterm_years | 20 | 100 | Pass | Loan Term |
| Form 1003 Uniform Residential Loan Application | no_of_months | 240 | 80 | Pass | Loan Term |
| Form 1008 Uniform Underwriting and Transmittal Summary | note_info_loan_term | 240 | 80 | Pass | Loan Term |
| Closing Disclosure | loanterm_years | 0 | Warning | Loan Term |
| Form 1003 Uniform Residential Loan Application | property_address_line1 | 219 Highland Court | 100 | Pass | Property Line1 |
| Form 1003 Uniform Residential Loan Application | property_address_line1 | 219 Highland Court | 0 | Pass | Property Line1 |
| Loan Estimate | property_address_line1 | 219 Highland Court | 0 | Pass | Property Line1 |

FIG. 4

| Batch Name | Rule Name | Loan Value | Audit Check | Message |
|---|---|---|---|---|
| 7559_101228_004776686026_25361 | Borrower First Name | Mildred | TRUE | |
| 7559_101228_004776686026_25361 | Borrower Last Name | Hart | TRUE | |
| 7559_101228_004776686026_25361 | Borrower SSN | 296-S7-1241 | TRUE | |
| 7559_101228_004776686026_25361 | Loan Amount | S46826 | TRUE | |
| 7559_101228_004776686026_25361 | Loan Term | 240 | TRUE | |
| 7559_101228_004776686026_25361 | Property Line 1 | 219 Highland Court | TRUE | |
| 7559_101228_004776686026_25361 | Property Line 2 | | TRUE | |
| 7559_101228_004776686026_25361 | Property City | Morganton | TRUE | |
| 7559_101228_004776686026_25361 | Property State | NC | TRUE | |
| 7559_101228_004776686026_25361 | Property Zip | 79929 | TRUE | |
| 7559_101228_004776686026_25361 | Borrower Present Address Line 1 Intra-Form | 81 Wagon Street | TRUE | |
| 7559_101228_004776686026_25361 | Borrower Present Address Line 2 Intra-Form | | TRUE | |
| 7559_101228_004776686026_25361 | Borrower Present Address City Intra-Form | Granger | TRUE | |
| 7559_101228_004776686026_25361 | Borrower Present Address State Intra-Form | IN | TRUE | |
| 7559_101228_004776686026_25361 | Borrower Present Address Zip Intra-Form | 52614 | TRUE | |
| 7559_101228_004776686026_25361 | Borrower Income | 4344.46 | TRUE | |
| 7559_101228_004776686026_25361 | Lender Case Number | 741987477 | TRUE | |
| 7559_101228_004776686026_25361 | Interest Rate | 3.65 | TRUE | |
| 7559_101228_004776686026_25361 | Lender Name | Smartechnologies | TRUE | |
| 7559_101228_004776686026_25361 | Period Principal | 910.55 | TRUE | |

FIG. 5

VALIDATION METHOD AND SYSTEM TO IMPROVE DATA ACCURACY

CROSS REFERENCE TO RELATED APPLICATION

This application claims the benefit of U.S. Provisional Application No. 63/072,360 filed on Aug. 31, 2020. The above identified patent application is herein incorporated by reference in its entirety and no portion of the identified patent application is being disclaimed.

TECHNICAL FIELD

The present disclosure relates generally to an automated method and system for validating data in an electronic document, such as a document that has been passed through an optical character recognition ("OCR") system or software application, to improve accuracy of the electronic document.

BACKGROUND

Many electronic documents used in various applications (e.g., invoice processing, loan processing, etc.) include data fields that are filled in manually. Such documents may include a single part (form) or multiple parts (forms) having various data fields (e.g., borrower's name address, loan amount, etc.) Some of the data fields may be repeated many times on a single form, such as the name and address on a federal W-2 form, while other data fields may repeat on more than one form in a document (e.g., an address field on a W-2 form and on a loan application intake form.) Because human operators often make mistakes during data entry, some filled-in fields may include wrong or inconsistent, information. For example, an address field entered with six consecutive digits for a zip code could indicate incorrectly entered zip code data. When it comes to inconsistencies between the same data fields, some inconsistencies may be ignored, while others may not. For example, if one address field uses the term "Avenue," while another, supposedly duplicate address field, uses the term "Street" or "Ave.", the inconsistency due to the term "Ave." may be ignored, but the inconsistency due to the term "Street" should not. Reviewing such documents requires significant repetitive clerical work, which can be time consuming and costly.

Similarly, electronic documents from an OCR process may include data errors that are caused by several different factors: a) incorrect data entries in the original document; b) an OCR error, where the OCR engine makes a mistake in converting the visual string to textual data; c) a data extraction error, where the configuration rules are not extracting the text string from the correct location, etc. Just like with the manually entered documents, review of OCRed documents requires significant repetitive clerical work, which can be time consuming and costly. But even manually conducted reviews may still include errors that were missed by human reviewers.

On the other hand, such repetitive work lends itself well to automated processes, such as those that combine robotic process automation ("RPA") with intelligent process automation. RPA uses machines (e.g., software, hardware, or combination of both), to handle repetitive, rule-based digital tasks. It is process driven and, since it does not require understanding of what it is doing, it is domain agnostic. On the other hand, intelligent process automation ("IA") combines artificial intelligence, machine learning, and process automation that is used to create smart processes (e.g., business processes) and workflows that think, learn, and adapt on their own. Because IA require understanding of complex processes, to be effective, it should be domain specific.

Invoice processing is but one example where RPA and IA can be combined into an automated process for creating electronic instantiated invoices in the system or to reconcile invoicing information with a purchase order database. Normally, during invoice processing, an employee would retrieve the electronic invoices from their email, download the attached invoices into a folder, and create the bills in their accounting software. An RPA robot can help automate the manual parts of this process (retrieving the invoices, downloading them, and creating them); however, it would require some help from intelligent automation to finish the job; intelligent automation would intelligently "read" the invoices and extract the required information from them (supplier name, invoice number and due date, any other pieces of information it has been asked to extract, etc.) before handing the job back to RPA to create the electronic instantiated invoices in the system or to match and reconcile with a PO database.

Mortgage and loan processing work is another use case that could lend itself well to automated (machine) processing, preferably one that combines RPA and IA, in which documents can be analyzed for accuracy and their information can be reconciled.

Accordingly, there is a need for an automated method and system that analyzes an electronic document, such as an OCRed document, to validate/reconcile its data fields. Such a system should run with minimal or no human input.

One object of the invention is a method and system that validates a data value in a data field of an electronic document using a rule applicable to that data field.

Another object of the invention a method and system that validates a data value in a data field of an electronic document based on a data value in a duplicate data field of the document.

Another object of the invention is a method and system that validates a data value in a data field of an electronic document based on data values in related data fields of the document.

Another object of the invention is a method and system that validates a data value in a data field of an electronic document based on data Values in a duplicate document.

Another object of the invention is a method and system that validates a data value in a data field of an electronic document based on data values in a related document.

Another object of the invention is a method and system that validates a data value in a data field of an electronic document based on data values in a modified version of the electronic document or in a new document.

Another object of the invention is a method and system that validates a data value in a data field of an electronic document based on multi-level validation approach.

Another object of the invention is a method and system that validates an electronic document to create a table of critical data fields with their data values and confidence values.

Another object of the invention is to have a method and system that validates classification of a received pre-classified multi-sectional electronic document.

Another object of the invention is to have a method and system that validates classification of a received multi-sectional electronic document based on data values or attributes within the document.

Another object of the invention is to have a method and system that utilizes classification results from two separate machines (classifiers) to determine more accurately the classification of a received multi-sectional electronic document.

SUMMARY

The present invention is directed to an automated method and system for validating (cross-validating) data fields in a document, such as a document that has been passed through an optical character recognition ("OCR") or Intelligent Document Recognition ("IDR") system or software, to improve accuracy of the electronic document. OCR and IDR systems scan a paper or electronic document, recognize and classify it, split it into parts/sections, and extract data from the document, such as data values and their corresponding confidence values. The present invention improves classification and data accuracy, assesses document (e.g., loan application file) integrity, and detects data variability within a document, such as a loan application document. The invention utilizes a multi-layered data validation approach to perform an independent check of the OCR/IDR and data extraction results to provide higher accuracy and further reduce human touch points, for touchless automation.

The invention improves data accuracy by i) checking data integrity and boosting the confidence of consistent data elements; and ii) allowing local data elements to communicate across transaction documents to determine a unified, cohesive data set.

For example, the invention resolves the uncertainties associated with OCR-based data extraction, such as to a value of the extracted data and as to whether it was extracted from the right location, thus converting documents to actionable, intelligent data.

The invention includes checking data with respect to similar data points in the document (file), business rules (e.g., checksum), and/or external sources.

For example, in one embodiment, the invention validates the extracted data value in a data field by checking that the value satisfies a business rule. This is referred to as "field-based" validation.

In another embodiment, the invention validates the extracted data value in a data field of an electronic document by validating (cross-validating) between duplicate data fields in a part of the document or in the whole document.

In another embodiment, the invention validates the extracted data value in a data field of an electronic document by validating (cross-validating) across related data fields in the same document.

In another embodiment, the invention validates the extracted data value in a data field of an electronic document by validating (cross-validating) across duplicate documents.

In another embodiment, the invention validates the extracted data value in a data field of an electronic document by validating (cross-validating) across static and dynamic documents, the latter being documents in which data value is modified and/or new data field is added.

In another embodiment, the invention validates the extracted data values in an electronic document to create a table of critical data fields with their data values, as well as their confidence values. For a loan processing document, for example, the table comprising [file #, data filed, data value] columns may include such entries as:

"0011, Borrower First Name, Mildred."
"0011, Borrower Last Name. Hart."
"0011, Loan Amount, 546826."

In another embodiment, the invention combines more than one validation method or rule to validate a data field in an electronic document, and to validate the whole document.

In another embodiment, the invention validates classification of a received pre-classified multi-sectional electronic document.

In another embodiment, the invention validates classification of a received multi-sectional electronic document based on data values or attributes within the document.

In another embodiment, the invention combines more than one classification method to classify a received multi-sectional electronic document more accurately.

The invention provides an automated document-analysis method comprising the steps of: (a) automatically selecting a data field in an electronic document; (b) automatically identifying each occurrence of the selected data field in the electronic document; (c) for each occurrence of the selected data field in the electronic document automatically obtaining a data value and a confidence value; (d) grouping the identified occurrences of the selected data field into a set of data-field groups based on their respective data values; (e) for each data-field group in the set of data-field groups, determining a number of occurrences of the selected data field and the data-field group's average confidence value; (f) applying a first set of criteria to each data-field group in the set of data-field groups, the first set of criteria comprising at least one of (i) a number of group-members, and (ii) a confidence value threshold; (g) based on a result of the applying step, designating one data-field group in the set of data-field groups as a global-value group; (h) increasing the average confidence value of the global-value group; (i) for an at least one occurrence of the data field in the global value group, increase the data field's confidence value; (j) obtaining a set of modification criteria; (k) applying a set of modification criteria to each occurrence of the a data field in a first data-field group, other than global-value group, in the set of data-field groups; and (l) depending on a result of applying the set of modification criteria, changing an at least one of the data value and confidence value of an at least one data field in the first data-field group to a corresponding value of a data field in the global-value group.

In one embodiment of the invention, the document is a loan-processing document.

The invention may also determine whether the selected data field is a critical data field; and if the selected data field is determined to be a critical data field, store the selected data field and its respective data value from the global-value group, in a global-value table. The invented method and system may also store in the global-value table the increased confidence value of the critical data field from the global-value group. The invented method and system may also flag the data field, stored in the global-value table, if the data field's confidence value in the global-value table is below a predetermined threshold. The invention may also compare the data value of the data-field in the global-value table against a data value of a data field in an external source.

The invention may group the occurrences of the selected data field into a set of data-field groups based on their respective data values using the steps of (a) determining whether the selected data field designates a character string; and (b) based on a result of the step of determining whether the selected data field designates a character string, for each data-field group, selecting all the data-field occurrences having (i) identical data values, and (ii) data values that are acceptable equivalents of the identical data value.

The invention may include the following criteria in the set of modification criteria: (i) a number of characters for a minimum edit distance in a character string, and (ii) a maximum percent difference between two numeric data values In the invented method and system, an occurrence of an associated data field may constitute an occurrence of the selected data field.

The invention may also determine whether at least two related data fields in the global-value table have an empty value.

The invention also provides an automated document-analysis method comprising the steps of: (a) automatically selecting a data field in an electronic document; (b) automatically obtaining a data value and a confidence value of the data field; (c) automatically identifying an at least one business rule applicable to the data field; (d) automatically applying the at least one business rule to the data value; (e) automatically determining a confidence level for the data value based on a result of the business rule applying step; and (f) adjusting the confidence value of the data field based on the determined confidence level. The at least one business rule may be selected from a set of business rules comprising (i) a valid data-range rule; (ii) a valid amount-range rule; (iii) a valid social-security number rule; (iv) a valid address rule; (v) a valid field-range rule; (vi) a valid enumerated-field rule; (vii) a regular-expression rule; (viii) a checkmark rule; and (ix) a mandatory-value rule.

The invention also provides an automated document-analysis method of claim comprising the steps of: (a) receiving an electronic document comprising a plurality of sections; (b) classifying the plurality of sections; (c) for each classified section, applying an at least one of (i) an intra-class rule; and (ii) an inter-class rule, wherein the intra-class rule comprises an at least one of (i) a single-subclass versioning rule; and (ii) a date versioning rule; and wherein the inter-class rule comprises an at least one of (i) a versioning-pass rule, and (ii) a-versioning-match rule; and (d) based on a result of the applying step, for each respective classified section, performing an at least one of (i) versioning the classified section; (ii) adjusting a data value of a data field in the classified section; and (iii) adjusting a confidence value of a data field of the classified section. The single-subclass versioning rule may comprise identifying a classified section comprising a single subsection.

The date-versioning rule of the invention may comprise: (a) identifying a classified section comprising a plurality of subsections, wherein the classified section belongs to a class of sections that comprises a date field; and (b) analyzing a data value of the date field in each subsection of the plurality of subsections. The date-versioning rule may further comprise using a predetermined data field in the classified section to separate the plurality of subsection into a first subsection-category and a second subsection-category, wherein the step of analyzing a data value of the date field in each subsection of the plurality of subsections includes separately analyzing a data value of the date field in each of the first subsection-category and the second subsection-category.

The versioning-pass rule of the invention may comprise: (a) selecting, from the plurality of sections, a first classified section and a second classified section; (b) identifying a final-version subsection of the first classified section; (c) identifying a final-version subsection of the second classified section; and (d) comparing a data value of a data field in the final-version subsection of the first classified section to a data value in a data field in the final-version subsection of the second classified section.

The versioning-match rule of the invention may comprise: (a) selecting, from the plurality of sections, a first classified section and a second classified section; (b) identifying a final-version subsection of the first classified section; (c) identifying a set of subsections of the second classified section; and (d) for each subsection in the set of subsections of the second classified section, comparing a data value of a data field in the subsection to a data value of a data field in the final-version subsection.

The invention also provides an automated document-analysis method comprising the steps of: (a) receiving an electronic document comprising a plurality of sections; (b) receiving a corresponding pre-classification value for each section of the plurality of sections; (e) classifying the electronic document, such that a corresponding classification value is determined for each section of the plurality of sections: (d) comparing the corresponding pre-qualification value for at least one section of the plurality of sections against the determined corresponding classification value for the section; (e) if the corresponding pre-qualification value does not match the determined corresponding classification value, performing an at least one of (i) identifying the section as mis-classified; (ii) designating the section for a manual review; and (iii) designating the section for an automated review.

The invention also provides an automated document-analysis method comprising the steps of: (a) receiving an electronic document comprising a plurality of sections; (b) classifying the electronic document, such that a corresponding classification value is determined for each section of the plurality of sections; (c) extracting an at least one attribute of each section of the plurality of sections; (d) comparing the at least one extracted attribute of an at least one section of the plurality of sections against an expected attribute determined based on the corresponding classification value for the section; (e) if the corresponding at least one extracted attribute does not match the expected attribute determined based on the corresponding classification value, performing an at least one of (i) identifying the section as mis-classified; (ii) designating the section for a manual review; and (iii) designating the section for an automated review.

The invention also provides an automated document-analysis method comprising the steps of: (a) receiving an electronic document comprising a plurality of sections; (b) classifying the electronic document using a first classifier, such that a corresponding first classification value is determined for each section of the plurality of sections; (c) classifying the electronic document using a second classifier, such that a corresponding second classification value is determined for each section of the plurality of sections; (d) comparing the two determined classification values for at least one section of the plurality of sections; and (e) if the two determined classification values do not match each other, performing an at least one of (i) identifying which of the two determined classification values is correct; (ii) identifying the section as mis-classified; (iii) designating the section for a manual review; and (iv) designating the section for an automated review.

The following description provides further details of the various embodiments of the invention.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIG. 2 illustrates a form having multiple occurrences of an address field;

FIG. 3 illustrates three separate versions of the Loan Estimate form that can be verified in accordance with an embodiment of the invention;

FIG. 4 shows a checklist report generated based on a verification method according to an embodiment of the invention;

FIG. 5 illustrates a global-values table generated in accordance with an embodiment of the invention;

DETAILED DESCRIPTION

The present invention provides for a method and a system using one or more levels of document validation.

One level of validating data element in an electronic document is a field-based validation level. In field-based validation, a value of an extracted data field is checked on whether it satisfies one or more logical business rules. The table below shows some exemplary field-based business rules for various data fields in a document.

| Field Name/ Type | Rule |
| --- | --- |
| Date | Must be a valid date. A date range can be applied. |
| Amount | Must be a valid numeric value. An amount range can be applied. |
| Social Security No. | Must be a valid SSN |
| Address | The address is verified against USPS list of city, state, and zip code. |
| Field Range | Must be valid within a range. For example, for a FICO field, FICO score must be within a valid range. |
| An Enumerated field | Must be a valid value from an enumerated list. |
| Regular Expression (RegEx) | Data fields, e.g., credit card numbers, are verified using RegEx |
| Check mark | Verified for single-select choice (e.g., male/female) and multi-select choices. |
| Mandatory | Must have a value and cannot be empty |

The invention is not limited to the field-based business rules listed in the above table, and, as discussed below, other business rules for these fields, as well as business rules for other data fields are contemplated by the invention.

Figure 1:
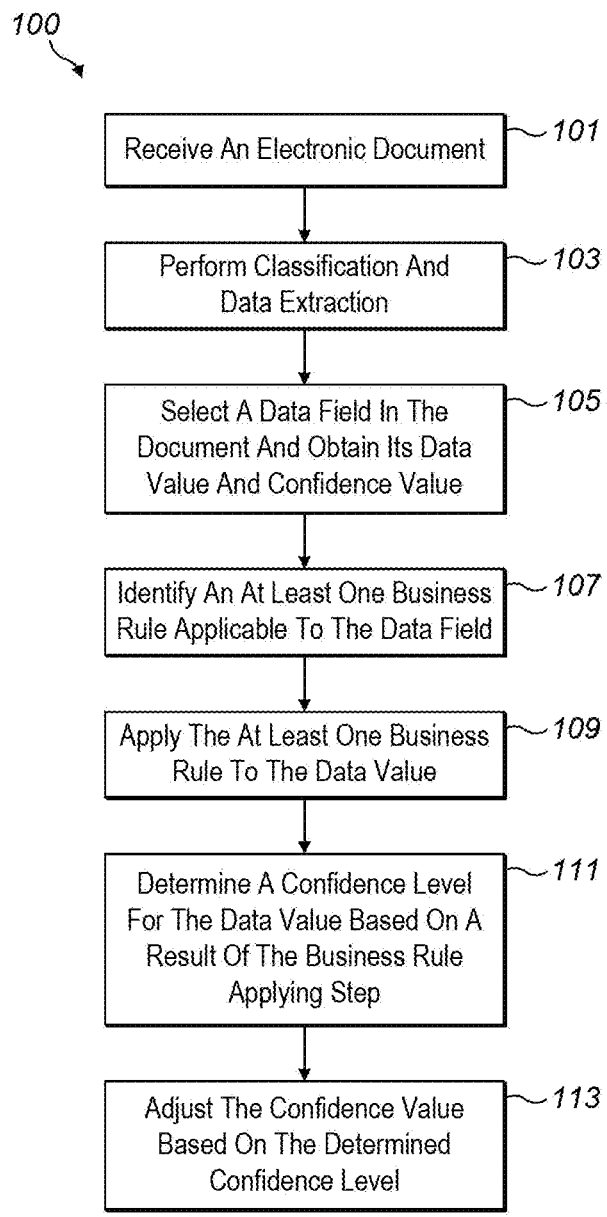
FIG. 1 is a flow chart of a method for performing field-based validation using a Business rule in accordance with an embodiment of the invention.

FIG. 1 shows a flow chart for performing field-based validation method 100 using a Business rule. The method 100 starts by receiving an electronic document in Step 101. Next, in Step 103, the system performs classification and data extraction via OCR or IDR. Next, in Step 105, a data field is selected for validation and its extracted data value and confidence value are obtained. From there, the method moves to Step 107, where an at least one business rule applicable to the data field is identified. Next, in Step 109, the business rule is applied to the data value of the data field.

For example, the system may compare the data value in the data field with a particular numerical range designated in the business rule to determine whether the data value is within the numerical range or not. Next, in Step 111, based on a result of applying the business rule, the method determines a confidence level for the data value. Next, in Step 113, based on the determined confidence level, the confidence value is adjusted. For example, if the data value is within the numerical range designated by the business rule, the determined confidence level may cause the confidence value to be increased. On the other hand, if the data value is outside the numerical range designated by the business rule, the determined confidence level may cause the confidence value to be decreased.

Another level of validating data element in a field of an electronic document involves comparing data value in a data field against the data value(s) in an identical data field in the same part of the document or across the whole group of forms (sections) comprising the document.

For example, the value of loan amount in the loan-amount field in one part of the document, e.g., a Closing Disclosure, may be compared against the loan-amount value of the loan-amount field in such other sections (forms) of the mortgage document as the 1003 mortgage application form, Desktop Underwriter form, Note, Loan Estimate, etc. When the loan-amount value is the same across all these forms, then it can be considered to be validated with 100% confidence, and the 100% confidence value is assigned to the loan-amount value of the loan-amount field.

Generally, a discrepancy in a data value in a data field across a document could be due to one or more of the following reasons: (i) an OCR error, where the OCR engine makes a mistake in convening the visual string to textual data, (ii) a data extraction error, where the configuration rules are not extracting the text string from the correct location, or (iii) where the data value in a document varies over time, such as during a loan application process, e.g., interest rate, loan value, cash to close may vary from the start of a loan application to close.

In the case of an OCR issue, the invented validation methods can apply fuzzy logic to determine if the data value is valid. For example, a street address may be slightly different on each part (form) in a document, yet these discrepancies may all be a part of an acceptable equivalence set, e.g., 123 Elm St., 123 Elm Str., 123 Elm Street, such that these data value variations do not imply a lack of integrity of the data.

FIG. 2 illustrates a form 200 having multiple occurrences of an address field. Specifically, the "Note" form 288 has three occurrences of the address field, the first occurrence 210, the second occurrence 212, and the third occurrence 214. Data value of the address field in the third occurrence 214, however, differs from the data values in the first and second occurrences (210 and 214, respectively). In particular, while in the first and second occurrences the street portion of the address is listed as "2240 SW 42$^{nd}$ Way", in the third occurrence it is listed as "2240 South West 42$^{nd}$ Way". When analyzing the data values of the three occurrences, however, the system would recognize that for an alphanumeric string in an address field, value "SW" is equivalent to "SouthWest." As a result, the system would consider the data values for all three occurrences of the data field to match.

Data extraction errors may require manual validation as the incorrectly extracted data in such a case is unlikely to match the corresponding correctly extracted data on another form. The present method and system, however, can minimize this problem by performing several data extraction processes using more than one data extraction method and then comparing the results.

The third source for data variation is where the information changes over time. An interest rate may increase, the loan amount may decrease, etc. In these cases, the different data values can be validated with respect to document versioning and a loan process timeline. As such, there may not be any loan packet inconsistency if there is a variation between the data values of a data field in an initial version and the final version of a form, e.g., Closing Disclosure.

Figure 3:
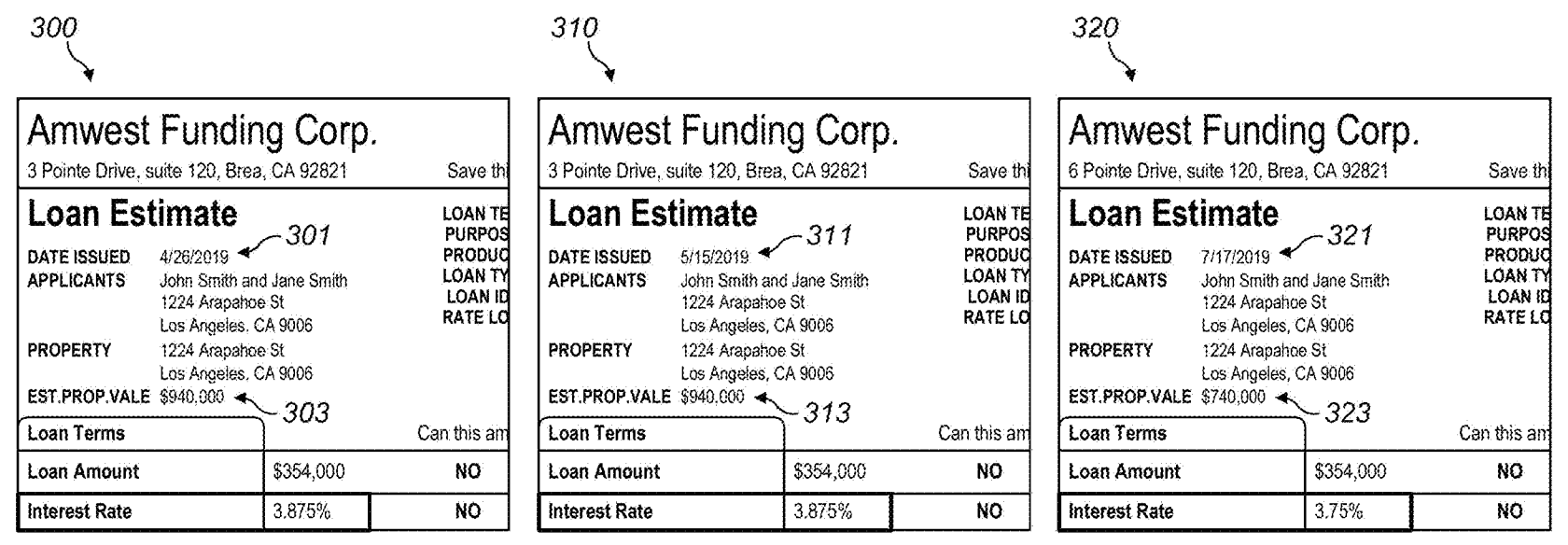

FIG. 3 illustrates three separate versions of the Loan Estimate form. All three versions include the "Date" and "Est. Prop. Value" data fields. The "Date" field 301 in the leftmost version 300 has a value of "7/17/2019", the "Date" field 311 in the middle version 310 has a value of "5/15/2019", and the "Date" field 321 in the rightmost version 320 has a value of "4/26/2019." As a result, based on date versioning, the leftmost version 300 can be designated as "Initial," the middle version 310 can be designated as "Intermediate," and the rightmost version 320 can be designated as "Final." Note, although the "Est. Prop. Value" fields in the Initial version 300 and Intermediate version 310 both have the data value "$940,000", the "Final" version 320 has the data value "$740,000". Because an estimated value of a property can change over time, the different data values in the "Est. Prop. Value" field in the initial (as well as intermediate) and final versions of the form do not necessarily indicate a data extraction error.

Yet, the invented validation method can find an error if the final terms (values) on one form, e.g., a 1003 form, are not aligned with the final terms (values) on another form, e.g., Closing Disclosure (e.g., loan amount, interest rate, term of loan).

Another level of validating data element in a field of an electronic document involves evaluating related data fields. Related data fields within a document may be validated in at least two ways: (i) alphanumeric strings are matched against related alphanumeric strings, and (ii) numeric values are matched with related equalvalues or using a checksum verification as part of a list or table.

For example, in mortgage processing, a software or system performing related data field validation can check whether the address in the borrower-address field equals the address in the co-borrower-address field on a 1003 mortgage application form, which is a related data field. If the data values in these data fields match, it strongly indicates that the OCR-based data extraction for that borrower-address field is correct. Related data fields not matching, however, do not necessarily indicate a data extraction error, as the borrower and co-borrower may have different addresses. The data value (a numeric dollar amount) in the monthly-payment field may be validated (cross-validated) with the data values of the loan-amount field, the interest-rate field, and the payment-period field using a mortgage calculation function as the checksum rule. If the loan amount, interest rate, payment period, and monthly payments are all in sync, then the validation module can verify that all the data values are correct.

Another level of validating a data value in a data field of an electronic document involves evaluating duplicate copies of the same page or part (form) in a document, where information is repeated more than once. This can occur when duplicate copies of the same form (e.g., 1003 form, Closing Disclosure) occur multiple times within a loan packet. These duplicate forms are used effectively for validation (cross-validation), If the loan packet has duplicate copies of a form, then the validation method looks for the corresponding data fields to match their data values. Having these data fields communicate through validation protocols increases data confidence values and corresponding pass-through rates.

For example, many W-2s have the same data replicated multiple times on the same page. If the document is replicated, the algorithm treats these version "copies" as duplicates, and they are validated (cross-validated) on a per data-field basis. So, if we have a W-2 form where the employer's name is printed four times on the same page, this data field is cross-validated against the other three W-2 instances.

Another level of validation involves validation using external sources, when those sources are available. For example, validation is applied to compare the global data values of the loan against its Mortgage-Industry-Standards-Maintenance-Organization-based ("MISMO"-based) Uniform Loan Delivery Dataset ("ULDD") representation. Values of the corresponding ULDD data fields, such as name, address, loan amount, term, and interest rate fields, are verified against the data extraction results and a checklist report, such as shown in FIG. 4 is generated.

Although many documents, e.g., some loans in the mortgage lending lifecycle, are static (i.e., not actively changing), many documents are dynamic (i.e., they change over time). One possible example of a dynamic document is a loan origination document with new or modified forms added on a regular basis. The present invention provides a method and system for handling both static and dynamic documents.

In particular, for static documents, once the document (e.g., a loan application) is OCRed/IDRed, the invention classifies, splits, stacks, and extracts data just once, with internal in-memory data representations that allow corresponding data fields across the loan packet to communicate with each other and ensure that their data values are in sync.

For dynamic documents, the present invention provides for the state of the document and its validation representation to be retained informationally in a table, e.g., via XML representation. In this way, there is a current state of the document with its validation status. In the event of a "document update," where additional forms (sections) are added to the loan packet, the validation tables are parsed from their XML representation, and the current validation tables are re-instated. Then, using the invented validation method, based on the new incoming forms, the data values in the data fields are updated to reflect the new information.

For example, assume the current state of the loan application document has a data value of $250,000 in the loan-amount fields and a data value of 4.25% in the interest-rate fields. These data values are reflected in the current Closing Disclosure (CD) form. Also assume that the neat day a new CD form is added to the client's loan application document. This new CD file has a modified data value of 300,000 in the loan-amount field and a modified data value of 4.0% in the interest-rate field. The invented method and system recognizes the new CD form, replicates the validation status table, determines whether the new CD form is the current "final" version, designates the previous CD form as an INT (intermediate) version, then validates that all the data values in the new final CD form are in sync with other final sections/forms of the loan application, such as a 1003 form and a Loan Estimate form.

The invented, method and system also provide for generation of a global-value table of critical data fields and their values. The invented validation process includes document versioning, as non-final versions of each form and their related data fields may not need to be synchronized with the final data terms of the document. For example, a non-final version of a form and its related data fields in a loan application may not need be synchronized with the data values of the data fields in the final version of the form. If the critical values are validated correctly, then document processing, e.g., pre-underwriting of a loan application document, can be fully automated. FIG. 5 illustrates an exemplary global-values table generated by the present invention for a loan application document.

Another level of validation involves validation based on comparison of the results of the data values in the various data fields after running several different OCR or IDR algorithms (e.g., applications from different vendors) on the same document.

The invented method and system may validate using various rules, such as: String-Matching rule, Numeric-Matching rule, Intra-Form-Validation rule, Empty-Validation rule, Rule-Matching rule, Word-Matching rule, Data-Extraction-Matching (DE-Matching) rule, Table-Matching rule, Credit Score rule (applicable to loan applications), Versioning-Date rule, Versioning-Pass rule, Versioning Match rule, Versioning-All rule, and Versioning-Order rule. Each of these rules is explained below in the context of a loan-processing document.

The String-Matching rule can be used to make string-based comparisons between specified fields to determine a global data value of a data field, preferably only one data field per form (sections of the document). For example, the borrower first name can be found in multiple forms (sections of the document), and all the data fields that contain the borrower first name are grouped together by their data values. Based on factors such as the number of members in a group and the average confidence value for a group, one group can be selected as the global-value-data-field group. The group members of the global-value-data-field group will have their confidence values increased, and for the members of other, remaining groups, depending on the criteria for data modification (such as a two-character maximum for the minimum edit distance), their data values can be changed to the data values of the members of the global-value-data-field group. There may also be a set of target fields for forms that typically have low confidence and missing values, so their OCR streams can be parsed, and if the global data value is found, the target fields will be populated with the global data value.

There may also be certain cases where a lookup table would be used. For example, if the current validation rule involved dealing with an address, and because there are many variations for certain parts of an address (such as "1$^{st}$" and "First", "Ste" and "Suite", "Rd" and "Road"), as discussed with respect to FIG. 1, all variations can be considered and treated as the same (as equivalent) when conducting comparisons.

The Numeric-Matching rule can be used to makes numeric-based comparisons between specified fields to determine a global data value, preferably only one data field per form (section of the document). For example, the loan amount can be found in multiple forms, and all data fields that contain the loan-amounts are grouped together by their data values (loan-amount values). Based on factors such as the number of members in a group and the average confidence value for a group, one group will be selected as the global-value-data-field group. The group members of the global-value-data-field group will have their confidence values increased, and for the other groups, depending on the criteria for data modification (such as a maximum percent difference between the two numbers), their data values can be changed to the data values of the members of the global-value-data-field group. There may also be a set of target fields from forms that typically have low confidence and missing values, so their OCR streams can be parsed, and if the global data value is found, the target fields will be populated with the global data value. As can be seen from the above description, the Numeric-Matching rule complements the String-Matching rule.

Figure 6A:
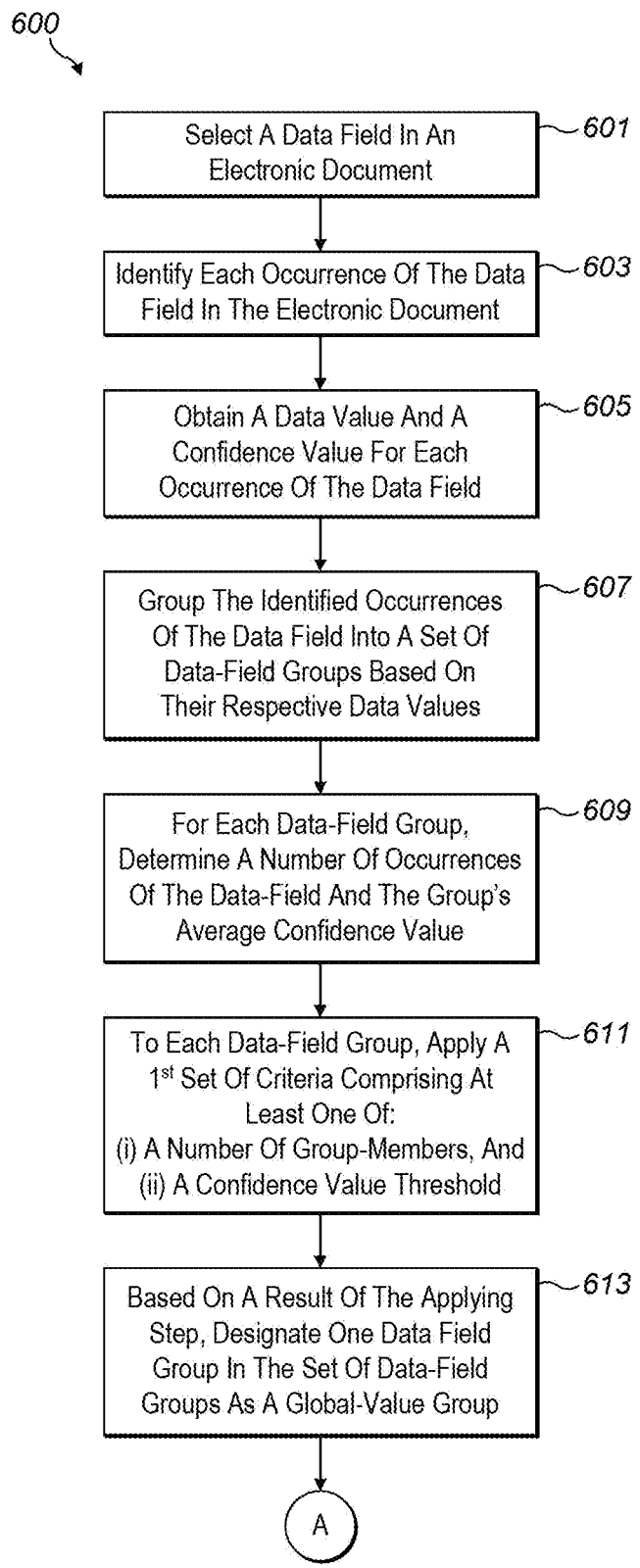
FIGS. 6A and 6B show a flow chart of a verification method combining the string-matching and numeric-matching in accordance with an embodiment of the present invention.
Figure 6B:
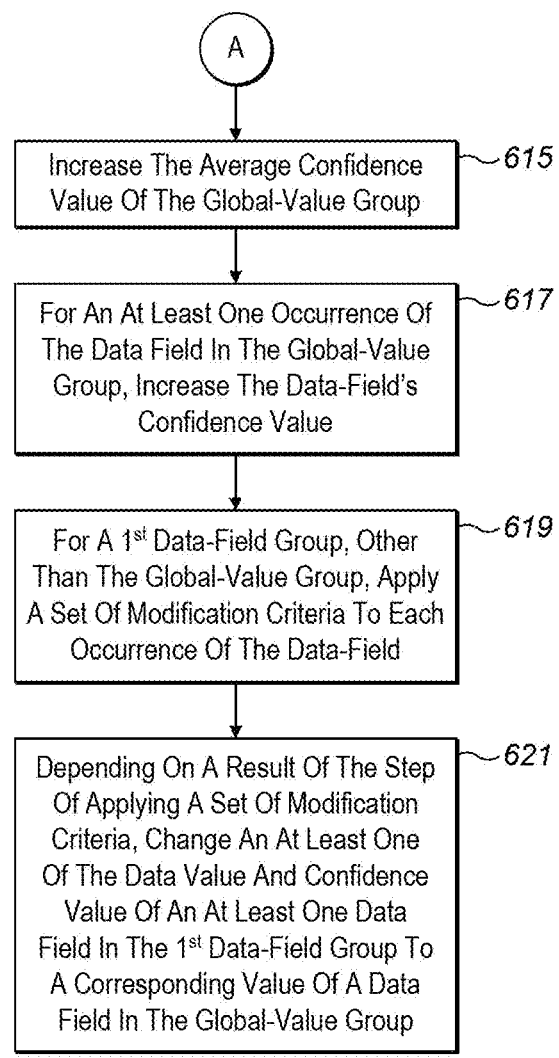

FIGS. 6A and 6B disclose an embodiment of a combination of the string-matching and numeric-matching methods of the present invention. The method 600 starts at Step 601 (FIG. 6A) by automatically selecting a data field in an electronic document. Next, in Step 603, each occurrence of the data field in the electronic document is identified. Then, in Step 605, a data value and a confidence value are obtained for each occurrence of the data field in the document. Next, at Step 607, the identified occurrences of the data field are grouped based on their respective data values. (As explained above, while for numeric values the grouping process would have a group include occurrences of the data fields with the identical data values, for alphanumeric strings a group will include occurrences of the data fields with both the identical data values and their equivalents.) Then, at Step 609, for each data-field group in the set of data-field groups, a number of occurrences of the selected data field and the data-field group's average confidence value are determined. Next, at Step 611, a first set of criteria is applied to each data-field group, where the first set of criteria includes at least one of: (i) a number of group-members, and (ii) a confidence value threshold. Then, at Step 613, based on a result of the applying Step 611, designating one data-field group in the set of data-field groups as a global-value group. Next, in Step 615 (FIG. 6B), the average confidence value of the global-value group is increased. Then, in Step 617, for an at least one occurrence of the data field in the global-value group, the data field's confidence value is increased. Next, the method proceeds to Step 619. In Step 619, for a data-field group in the set of data-field groups, other than the global-value data field, a set of modification criteria is applied to each occurrence of the data field. The set of modification criteria can include as a criterion (for a character string) a number of characters for a minimum edit distance in a character string, or a criterion (for a numeric value) of a maximum percent difference between two numeric data values. Then, in Step 621, depending on a result of the applying Step 619, an at least one of the data value and confidence value of an at least one data field in the data-field group (other than the global-value group) is changed to a corresponding value of a data field in the global-value group.

The Intra-Form rule can be used to compare specified fields across different forms, preferably one field per form. For example, the borrower address can be found across many forms, and sometimes, in many occurrences within the same form. As such, first, all the possible data fields that can contain the borrower address can be grouped together, with the data fields such as "Borrower Mailing Address" (Form 1003), "Coborrower Mailing Address" (Form 1003), "Borrower Present Address" (Form 1003), "Coborrower Present Address" (Form 1003), and "Applicant Address" (Closing Disclosure). Then, the Intra-Form rule would behave like the String-Matching rule described above.

The Empty-Validation rule can be used to verify if the determined global values (resulting from previous rules) are empty. For example, for some loans, there is no coborrower. So, the Empty-Validation rule can be used to verify whether a coborrower exists or not. To do that, the resulting global data values from other validation rules, such as the values of "Coborrower First. Name," "Coborrower Last Name," and "Coborrower Social Security Number" are looked at to confirm whether a coborrower exists or not.

The Rule-Matching rule can be used to verify if the data values in specified data fields match the data values in the data fields obtained from another rule(s). For example, depending on whether a coborrower exists in a loan, his/her address can be cross validated. First, the results from other rules such as the Empty-Validation rule regarding the coborrower may be considered. From there, all possible locations of the coborrower address can then be grouped together. Then, the Rule-Matching rule would behave like the Intra-Form rule described above.

The Word-Matching rule can be used to verify if a specified field includes the global data value determined from other rules. For example, the title for a property may contain both the borrower's name and the coborrower's name (if they exist). So first, the fields whose values are determined by the String-Matching rule, such as "Borrower First Name", "Borrower Last Name", "Coborrower First Name", "Coborrower Last Name", and the Empty-Validation rule for the coborrower are considered. Then, the Word-Matching rule would behave like the Rule-Matching rule.

The DE-Matching rule can be used to verify/validate if the specified data fields share the same DE assigned confidence values as the specified confidence value. For example, in the "Form in 1003—Uniform Residential Loan Application," there is a checkbox to indicate whether the property in question will be a primary residence. So, the data field that contains the data extraction results for this checkbox is/are examined. Specifically, the confidence-value result is compared to a confidence value specified in an XML file that contains the validation rules. If both confidence values match, then the confidence value of the data value in the data field is increased.

The Table-Matching rule can be used to verify/validate data between similar tables of two form/section types (e.g., Closing Disclosure ("CD") and Loan Estimate ("LE")), and boost confidence values of data values in the various data fields. For example, CD includes a table named "Services Borrower Did Not Shop For" and LE includes a table named "Services You Cannot Shop For." The two tables can sometimes share the same data fields, so they are compared to one another. And for data fields within these tables that end up matching their data values, the confidence values for the data values in these data fields are increased.

The Credit-Score rule can use credit score related fields from other, more reliable forms (e.g., Loan Processing ("LP") and Desktop Underwriting ("DU")) to verify and modify data values in the data fields in a specified form (e.g., Credit Report). For example, the borrower is assigned three credit scores, and these credit scores can be found in different classes of forms. One of the classes that includes the borrower's credit score is "Credit Report." However, the confidence values for the credit-score fields are usually low. Because of this, classes of forms with higher average confidence values for the credit-score fields are selected. Specifically, these classes may be the DU or LP forms. Depending on which class of form exists in the loan packet (because both the DU and LP forms cannot exist in a loan packet at the same time), the credit-score fields are then selected from the more reliable class and then their data values are used to either modify or populate the Credit Report's credit-score fields.

Versioning rules constitute another category of rules that may be used to validate a document. Versioning rules that operate on sections (forms) of the same class are being referred to as intra-class rules, and the versioning rules that operate on sections (forms) from different classes are being referred to as inter-class rules.

The Versioning-Date rule can use data fields to determine the versioning between all the different occurrences of a specific form. For example, to version a form class such as "Closing Disclosure" or "Loan Estimate", the Date-Issued field is analyzed, and used to order all forms in the loan application document. The forms with the latest dates can be designated as "Final," the forms with the earliest dates can be designated as "Initial" and the forms with intermediate dates can be designated as "Intermediate." If there is a problem with parsing any of the form's fields, then any problematic forms may get designated as "Manual" with a low version confidence. This can be applied to other versioning rules.

The Versioning-Pass rule can be used to verify the final forms between two form classes and to boost confidence values of the forms when certain criteria are met. For example, the Versioning-Pass rule can be used in the versioning logic for "Closing Disclosure" and "Loan Estimate" forms. For example, once all the final Closing Disclosures and final Loan Estimates forms are determined by the Versioning-Date rule, these final forms can then be compared to one another by looking at specific data fields. For Closing Disclosure, there is a table called "Calculating Cash To Close", and in this table, monetary values are listed from both the entire loan packet and final Loan Estimate. So, the data values of the data fields in this table can be analyzed, and the data values of corresponding data fields in the final Loan Estimate can then compared to the data values in the data fields in the table. And if all the necessary data values match up between the data fields in the table in the Closing Disclosure and the data fields in the Loan Estimate, then both the final Closing Disclosure and final Loan Estimate form in versions can have their confidences values increased.

The Versioning-Match rule can be used to compare a specified data field from one form (that has yet to be versioned, e.g., "Form 1008—Uniform Underwriting and Transmittal Summary") to a specified data field from another form (e.g., Loan Note) that has already been versioned as "Final." For all occurrences of Form 1008 in the loan packet, the loan-amount field is selected, and the field's data value is compared to the loan-amount value in the loan-amount field in the "final" Note. For any of the Form 1008 occurrences having matching loan-amount values, they are designated as "final" Form 1008 versions.

Assuming a form is not on a list of "exception" forms, the Versioning-All rule can be used to version the form as follows. If there is only one occurrence of the form in the loan packet, it can be designated as "Final" version, and if there is more than one occurrence of the form in the loan packet, all occurrences may be designated as "Manual" version. For example, assume a "Standard Flood Hazard Determination" form has a "version" field outputted by data extraction, and also assume that there is no versioning rule to handle this form-class. If only one "Standard Flood Hazard Determination" form exists in the loan packet, then that form can be designated as "Final" with high confidence. However, if there are more than "Standard Flood Hazard Determination" form in the loan packet, then all occurrences can be designated as "Manual" with a low confidence value.

The Versioning-Order rule can be applied to use form's submission (ID) number and/or timestamps to determine versioning between all the different occurrences of a specific form, such as the "DU-Desktop Underwriting" form and the "LP-Loan Prospector" form. Both forms will typically include a submission-number field and a submission-timestamp field. All occurrences of each form are first ordered by the submission-number value and then, each submission number group having the same submission-number value ordered by the submission-timestamp value. The latest "DU-Desktop Underwriting" and the "LP-Loan Prospector" forms after the results of this ordering are designated as "final" versions.

Figure 7:
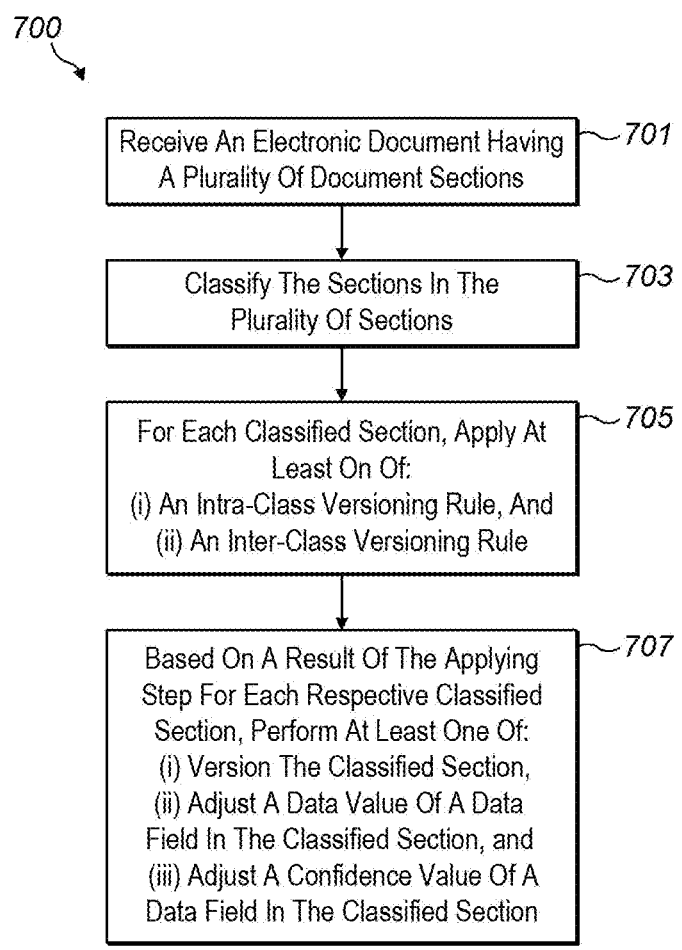
FIG. 7 is a flow chart of a method for implementing versioning miles in accordance with an embodiment of the invention.

FIG. 7 shows an embodiment of a method for implementing versioning rules. The method 700 starts at Step 701 by receiving an electronic document having a plurality of document sections (e.g., forms). At Step 703, the sections in the plurality of sections are classified, based on document classes. Next, at Step 705, for each section, the method applies at least one of (i) an intra-class rule, and (ii) an inter-class rule. (Note, if the classification Step 703 identified only a single class of sections, then Step 705 will only apply intra-class rules.)

As described above, the set of intra-class rules includes (i) a single-subclass versioning rule; and (ii) a data-versioning rule. The single-class versioning rule includes identifying a classified section comprising a single subsection. The data-versioning rule comprises (a) identifying a classified section including a plurality of subsections, wherein the classified section belongs to a class of section that includes a data field, and (b) analyzing a data value of the data field in each subsection of the plurality of subsections.

On the other hand, the set of inter-class rules includes (i) a versioning-pass rule, and (ii) a versioning-match rule. The versioning-pass rule include the steps of (a) selecting, from the plurality of sections, a first and second classified sections; (b) identifying a final-version subsection in each the first and second classified sections, respectively; and (c) comparing a data value of a data field in the final-version subsection of the first classified section to a data value of a data field in the final-version subsection of the second classified section. The versioning-match rule includes the steps of: (a) selecting, from the plurality of sections, a first classified section and a second classified section; (b) identifying a final-version subsection of the first classified section; (c) identifying a set of subsections of the second classified section; (d) for each subsection in the set of subsections of the second classified section, comparing a data value of a data field in the subsection to a data value of a data field in the final-version subsection.

From Step 705 the method proceeds to Step 707. In Step 707, based on a result of the applying Step 705, to each respective classified section, the method performs at least one of (i) version the classified section; (ii) adjust a data value of a data field in the classified section; and (iii) adjust a confidence value of a data field in the classified section.

In another embodiment, the system receives an electronic document having a plurality of sections where each section has already been classified. In other words, the document has been pre-classified and each section has a pre-classification value. The received electronic document is also preferably accompanied by an electronic file comprising a pre-classification table listing the classifications values for the various sections. The method and system of the present invention accepts the pre-classified electronic document and its corresponding pre-classification table and perform its own classification of the document. This results in having a classification value derived for each section. Afterwards, for each section of the electronic document, the method and system of the present invention compares the section's classification value in the pre-classification table against the derived classification value. For example, the method and system of the present invention compares its classification results (e.g., class ID) using a supervised classifier (such as SVM) versus electronic class representation of same document, as in filename or data file. If the values match, it confirms that the section was pre-classified correctly. Otherwise, the section is identified as potential mis-classified section and designated for further review, manual or automated.

In another embodiment, the system receives an electronic document having a plurality of sections. The method and system of the present invention performs both classification of the document as well as data extraction and/or other processes or analysis of the document. This results in having a classification value derived for each section and well as data values or other attributes derived from the document. Afterwards, for each section of the electronic document, the method and system of the present invention compares the section's data values or other attributes against the derived classification value. For example, the data configuration file (a file that includes data extraction rules) comprising values properly extracted with keyword geometric positioning can verify that document layout is consistent with the classification assigned to it. Consequently, the method and system of the present invention confirms that if the classification matches the structural layout of the document, the classification is correct. Otherwise, the section is identified as potential mis-classified section and designated for further review, manual or automated. As an example, if the classifier classifies a page as a paystub, then the Paystub rules, which are included in the data configuration file for data extraction, would be used. If the extracted data corresponds to data expected from a paystub, this validates that the classifier is correct. Otherwise, if a section has been misclassified as a paystub, the paystub data extraction rules would not work effectively.

In another embodiment, the system receives an electronic document having a plurality of sections. The method and system of the present invention performs classification of the document using two independent machines/classifiers, such as two SVMs (Support Vector Machines) trained on two different data sets. This results in having two classification values derived for each section. Afterwards, for each section of the electronic document, the method and system of the present invention compares the two derived classification values against each other and decides which is correct, or whether the section should be identified as potential mis-classified section and designated for further review, manual or automated.

Because classification results may not only include a classifier but may also include its associated confidence value (e.g., between 0 and 100), one way for the automated method and system of the present invention to decide which of the two classifiers is correct is to compare their confidence values and to select the one with a higher value. As an additional confirmatory step, the system may further compare the selected classifier's confidence value against a predetermined threshold.

Additional rule-based algorithms may be utilized as well, such as determining whether consecutive pages belong in the same section or should be split based on whether one or both of the two classifiers classified those pages as the same class. Another algorithm that may be used is to consider one of the classifiers as an "expert" and give its result more weight if there is a particular class that that classifier was trained on but the second classifier was not trained on.

Another option is to train a third SVM based on the classification results output by the two classifiers as well as the manually determined correct answer. In other words, the system would take in a lot of data (PDFs), obtain classification results using the original two classifiers, and then accept what was manually determined as the correct answer was for each section or page. Then a third machine would be trained to learn the correct answer based on the first two machines' classification results and the manually determined classification result. For example, if every time the first classifier output A, the second classifier output B, and the manual correction shows that B is always correct, then the purpose of the third machine would be to learn that pattern.

The present invention may be implemented in software, hardware, firmware, or their combinations. When implemented in software, programming instructions for the different validation levels described above may be implemented as separate software modules. The software may then be stored on a server(s), a local computer, a portable memory (e.g., CD, solid state memory, etc.) or it may be downloaded from cloud storage over the Internet. Once the software in the present invention is downloaded onto a server or a computer, a microprocessor inside the server or the computer executes the instructions to verify electronic documents according to the present invention.

When designed in hardware or firmware, the server or the computer may verify electronic documents according to the present invention without any downloading of software code from portable storage or from cloud storage.

In one alternative embodiment, the system for verifying documents according to the present invention may reside remotely (e.g., in the cloud or on a local network), in which case a user would first log into the remote validation system, present his/her electronic document to the validation system and would let the system validate the document remotely.

Although the disclosure is described herein with reference to specific embodiments, various modifications and changes can be made without departing from the scope of the present disclosure as set, forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

Because individual structures (implemented in programming instructions, circuits, or their combinations) for performing the various steps of the invented method, such as "receiving," "obtaining", "selecting," "classifying", "grouping", "identifying," "determining," "comparing", "applying", and "adjusting" are known to one skilled in the art, the steps have been disclosed at a logical (flow chart) level only, and further details are not necessary for making and using the invention.

Unless stated otherwise, terms such as "first" and "second" are used to arbitrarily distinguish between the elements such terms describe. Thus, these terms are not necessarily intended to indicate temporal or other prioritization of such elements.

Unless otherwise stated, conditional terms such as "can", "could", "will", "might", or "may" are understood within the context as used in general to convey that certain embodiments include, while other embodiments do not include, certain features and/or elements. Thus, such conditional terms are not generally intended to imply that features and/or elements are in any way required for one or more embodiments.

It will be understood by those within the art that, in general, terms used herein, are generally intended as "open" terms (e.g., the term "including" should be interpreted as "including but not limited to", the term "having" should be interpreted as "having at least", the term "includes" should be interpreted as "includes but is not limited to", etc.).

We claim:

1. An automated document-analysis method comprising the steps of:
    automatically selecting a data field in an electronic document;
    automatically identifying each occurrence of the selected data field in the electronic document;
    for each occurrence of the selected data field in the electronic document automatically obtaining a data value and a confidence value;
    grouping the identified occurrences of the selected data field into a set of data-field groups based on their respective data values;
    for each data-field group in the set of data-field groups, determining a number of occurrences of the selected data field and the data-field group's average confidence value;
    applying a first set of criteria to each data-field group in the set of data-field groups, the first set of criteria comprising at least one of
        (i) a number of group-members, and
        (ii) a confidence value threshold;
    based on a result of the applying step, designating one data-field group in the set of data-field groups as a global-value group, increasing the average confidence value of the global-value group;
    for an at least one occurrence of the data field in the global-value group, increase the data field's confidence value;
    obtaining a set of modification criteria;
    applying a set of modification criteria to each occurrence of a data field in a first data-field group, other than global-value group, in the set of data-field groups; and
    depending on a result of applying the set of modification criteria, changing an at least one of the data value and confidence value of an at least one data field in the first data-field group to a corresponding value of a data field in the global-value group.

2. The automated document-analysis method of claim 1, wherein the document is a loan-processing document.

3. The automated document-analysis method of claim 1, further comprising determining whether the selected data field is a critical data field; and
    if the selected data field is determined to be a critical data field, storing the selected data field and its respective data value from the global-value group in a global-value table.

4. The automated document-analysis method of claim 3, further comprising storing in the global-value table the increased confidence value of the critical data field from the global-value group.

5. The automated document-analysis method of claim 4, further including a step of flagging the data field, stored in the global-value table, if the data field's confidence value in the global-value table is below a predetermined threshold.

6. The automated document-analysis method of claim 3, further comprising the step of comparing the data value of the data-field in the global-value table against a data value of a data field in an external source.

7. The automated document-analysis method of claim 1, wherein the step of grouping the occurrences of the selected data field into a set of data-field groups based on their respective data values comprises the steps of:
   determining whether the selected data field designates a character string; and
   based on a result of the step of determining whether the selected data field designates a character string, for each data-field group, selecting all the data-field occurrences having (i) identical data values, and (ii) data values that are acceptable equivalents of the identical data value.

8. The automated document-analysis method of claim 1, wherein the set of modification criteria comprises one of (i) a number of characters for a minimum edit distance in a character string, and (ii) a maximum percent difference between two numeric data values.

9. The automated document-analysis method of claim 1, wherein an occurrence of an associated data field constitutes an occurrence of the selected data field.

10. The automated document-analysis method of claim 1, further comprising a step of determining whether an at least two related data fields in the global-value table have an empty value.

\* \* \* \* \*